(12) United States Patent
Komiya (10) Patent No.: US 6,966,527 B2
(45) Date of Patent: Nov. 22, 2005

(54) CLOSED CABLE DRAG CHAIN

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 84 days.

(21) Appl. No.: 10/679,540

(22) Filed: Oct. 6, 2003

(65) Prior Publication Data

US 2004/0084573 A1 May 6, 2004

(30) Foreign Application Priority Data

Nov. 5, 2002 (JP) ............................. 2002-321425

(51) Int. Cl.[7] ........................................... H01R 13/56
(52) U.S. Cl. ..................... 248/49; 59/78.1; 138/120; 174/69; 285/223; 439/445
(58) Field of Search ................. 248/49; 439/445, 439/446; 174/69, 68.3; 138/118, 120; 285/223, 285/22; 59/78.1, 84, 85, 79.3

(56) References Cited

U.S. PATENT DOCUMENTS

| | | | | |
|---|---|---|---|---|
| 3,319,300 A | * | 5/1967 | Hehl ........................... | 425/470 |
| 4,690,665 A | * | 9/1987 | Oliver et al. ................ | 474/245 |
| 6,318,063 B1 | * | 11/2001 | Komiya et al. .............. | 59/78.1 |
| 6,334,615 B1 | * | 1/2002 | Uchiyama et al. .......... | 277/376 |

FOREIGN PATENT DOCUMENTS

| | | | |
|---|---|---|---|
| EP | 1094585 A1 | * 4/2001 | .......... H02G 11/00 |
| JP | P3349148 | 9/2002 | |

* cited by examiner

Primary Examiner—Korie Chan
(74) Attorney, Agent, or Firm—Woodling, Krost and Rust (57) ABSTRACT

To provide a closed cable drag chain, which is capable of preventing the contact wear powder generated in the holding and guiding the inserted cable or the like from being scattered into an operation space, and of suppressing noises such as sliding contact noise and scattering sounds, and wherein the assembling, maintenance and repair are easy and early wear of the cable or the like can be suppressed. In a closed cable drag chain in which a cable or the like C is inserted into said chain in a tubular fitting state where removable outer frames 120 fit-covers connecting spaces S between a number of adjacent intermediate frames 110 to close the connecting spaces S therebetween respectively, whereby the cable or the like is guided while being held, a connecting portion 111c provided with engraved pin hole on a rear side of the intermediate frame body is integrally two-color injection molded with a polyamide resin softer than a glass-fiber reinforced polyamide resin forming other portions of the intermediate frame body 111.

4 Claims, 7 Drawing Sheets

CLOSED CABLE DRAG CHAIN

This application claims priority to Japanese Patent Application No. 2002-321425 filed Nov. 5, 2002.

TECHNICAL FIELD TO WHICH THE INVENTION PERTAINS

The present invention relates to a technical field of a cable drag chain, which holds and guides an electric cable, or a hydraulic or pneumatic hose between a mobile portion, which is operated while moving, and a fixed portion, in a machine tool, a civil engineering machinery, a transfer system or the like.

RELATED ART

When a cable or a hydraulic or pneumatic hose is connected to a device, which operates while moving, such as a machine tool, a civil engineering machinery, a transfer system or the like, undue torsion or tension can be generated in the cable or hose due to by its movement thereby damaging a cable or a hose in an exposed state and disordering its outward appearance. Therefore, a cable drag chain for holding and guiding an inserted cable or hose has been proposed.

Figure 6:
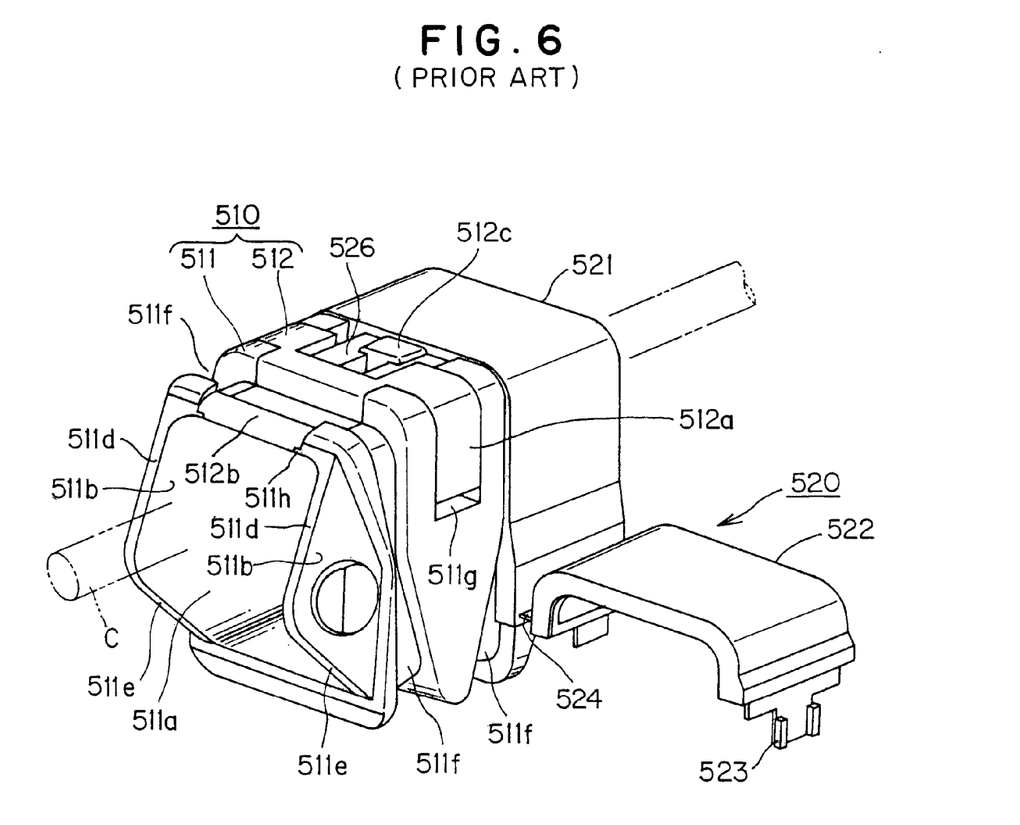
FIG. 6 is a perspective view in which a part of a conventional closed cable drag chain was enlarged.
Figure 7:
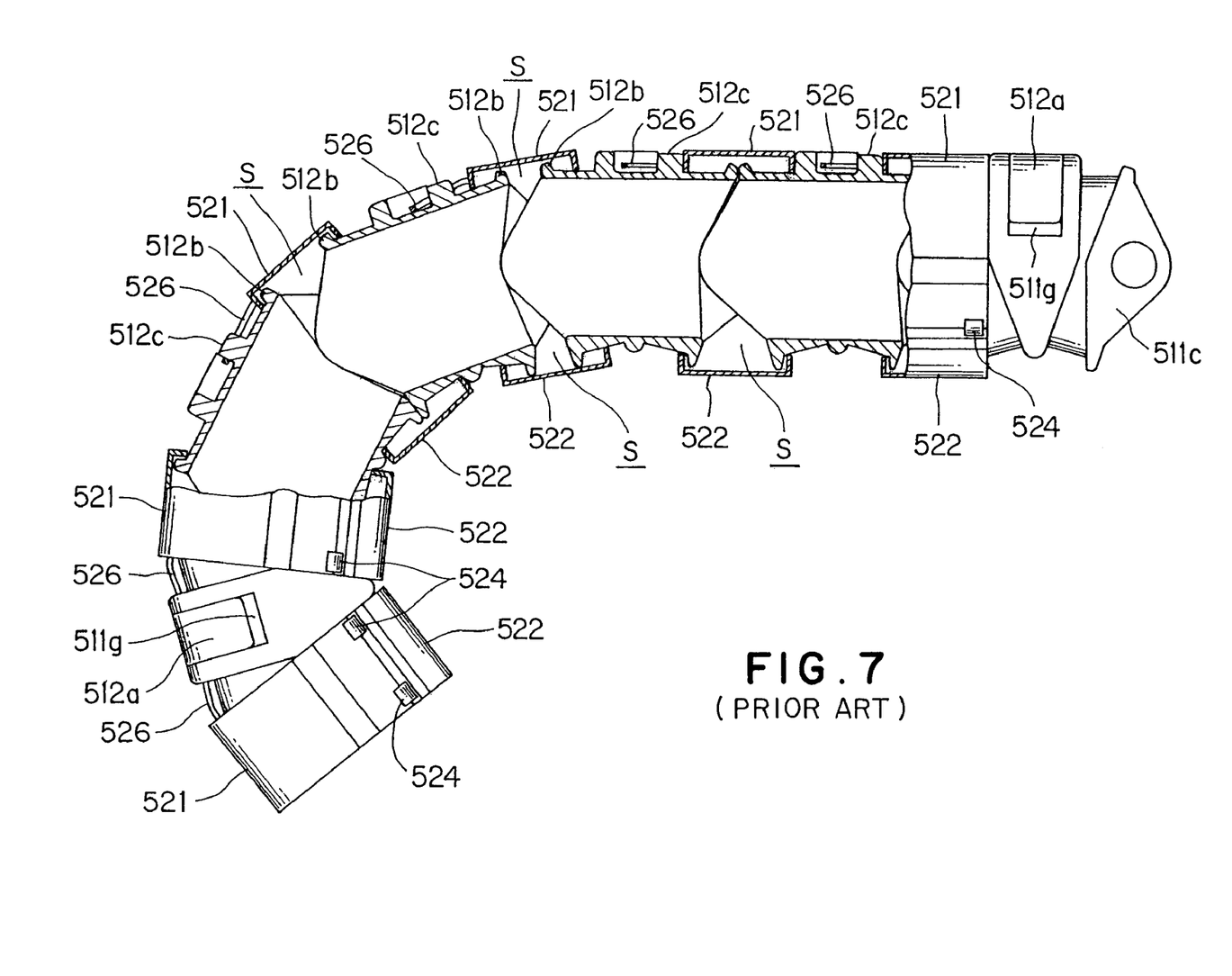
FIG. 7 is a side sectional view showing a state of the operation of the closed cable drag chain shown in FIG. 6.

A conventional cable drag chain 500 has been configured as shown in FIGS. 6 and 7 in such a manner that a number of intermediate frames 510 provided with cable holding grooves 511a inside their frames respectively are articulately connected to each other, a removable outer frame 520 fit-covers a connecting portion between adjacent intermediate frames 510, and adjacent upper open end surfaces 511d, which are brought into contact with each other on the articulated outer peripheral side of the chain to hold a straightly extended position and adjacent lower open end surfaces 511e, which are brought into contact with each other while circulating on the articulated inner peripheral side of the chain to hold a required articulated position, are formed so that a cable or the like C is inserted into said chain in a tubular fitted state where connecting spaces S between the adjacent intermediate frames 510 are closed respectively, to be held and guided.

Patent reference 1, Japanese patent publication No. 3349148 (page 1, FIGS. 1 to 3)

Problems to be Solved by the Invention

However, since the above-described cable drag chain 500 adopts a hard glass-fiber-reinforced polyamide resin as the material of the intermediate frame 510 and outer frame 520 in consideration of member strength, wear property, shape retention and the like, when adjacent upper open end surfaces 511d (FIG. 6), which hold a straightly extended position, are sequentially brought into contact with each other on the articulated outer peripheral side or when adjacent lower open end surfaces 511e (FIG. 7), which hold a required articulating position are sequentially brought into contact with each other on the articulated inner peripheral side while circulating, as shown in FIG. 7, the cable drag chain generates clattering sounds, or when the adjacent upper open end surfaces 511d or the adjacent lower open end surfaces 511e of the intermediate frame body 511 are brought into connect with each other, the outer frame 520; which moves so that it fit-covers a connecting space S between adjacent intermediate frames 510 to close it, generates sliding-contact noises between the intermediate frame 510 and the outer frame 520, resulting in a cause for the generation of noises under operation environment.

Further, when a number of said intermediates 510 are connected to each other to assemble a chain, since the intermediates 510 adopt a hard material made of a glass-fiber reinforced polyamide resin, a fitting operation between a connecting portion 511b of the intermediate frame body 511, provided with a protruded connecting pin, and a connecting portion 511c provided with an engraved pin hole must be forcibly performed in tight conditions and there was a problem that the assembling operation efficiency is not sufficient.

Further, when the adjacent lower open end surfaces 511e of said intermediate frame body 511 are brought into contact with each other on the articulated inner peripheral side of the chain while circulating, to hold a required articulated position, since these contact portions exhibit sharp edges, there was a problem that a cover on a cable or a hose wears abnormally and can be early broken.

Accordingly, the object of the invention is to solve the above-mentioned problems and to provide a closed cable drag chain, which is capable of preventing the contact wear powder generated in holding and guiding an inserted cable or hose from being scattered into an operation space, and of suppressing noises such as clatter sounds, sliding contact sounds and the like, which tend to occur during the holding and guiding the cable or hose, and wherein the assembling, maintenance and repairing of the chain are easy and early wear of the cable or hose can be suppressed.

Means for Solving the Problems

To solve the above-mentioned problems a closed cable drag chain according to claim 1, in which each of a number of intermediate frames includes an intermediate frame body provided with a cable holding groove inside and having connecting portions on the front and rear portions, and an opening/closing lid member, which is fitted to said cable holding groove, and wherein adjacent upper open end surfaces of the adjacent intermediate frames, which are brought into contact with each other on an articulated outer peripheral side of the chain to holds a straightly extended position and adjacent lower open end surfaces of the adjacent intermediate frames, which are brought into contact with each other on an articulated inner peripheral side of the chain while circulating to hold a required articulated position, are formed so that said intermediate frames are articulately connected through said connecting portions, and cable or the like is inserted into the chain in a tubular fitted state where removable frames fit-cover the connecting portions between said adjacent intermediate frames to close the respective connecting spaces between said adjacent intermediate frames, whereby the cable or the like is held and guided, is characterized in that: at least any one of said front and rear connecting portions of said intermediate frame body is integrally two-color injection-molded with a second polymer resin material softer than a first polymer resin material forming other portions of the intermediate frame body.

A closed cable drag chain according to claim 2 further solves the above-mentioned problems by that fact that at least any one of said front and rear bend limiting end portions of said opening/closing lid member is integrally two-color injection-molded with a second polymer resin material softer than a first polymer resin material forming other portions of the opening/closing lid member in addition to the configuration of claim 1.

Further, a closed cable drag chain according to claims 3 and 4 further solves the above-mentioned problems by the fact that at least a groove bottom portion of the cable holding groove is integrally two-color injection-molded with said second polymer resin material in addition to the configuration according to claims 1 and 2, respectively.

Further, a closed cable drag chain according to claims 5, 6, 7 and 8 further solves the above-mentioned problems by the fact said outer frame is molded with said second polymer resin material in addition to the configuration according to claims 1, 2, 3 and 4, respectively.

The two-color injection-molding in the present invention is a method in which on a primary layer molded by a usual injection molding is injected a polymer resin material different from the material of the primary layer in a laminated layer or in which primary and secondary molded polymer resin materials are arranged on the same plane, and specifically means an injection molding including mixed color molding, insert molding and the like.

As the first polymer resin material and the second polymer resin material used in the present invention any polymer resin materials called as engineering plastics, excellent in wear resistance and lubricity, such as a polyamide resin, a polyacetal resin, a polypropylene, acryl resin, a polycarbonate resin and the like, can be used. Particularly, when a polyamide resin is used as the first polymer resin material, it is preferred in viewpoints of wear resistance, noise property, chain bending or articulation property, assembling work, working costs and the like that a glass-fiber reinforced polyamide resin is adopted as the second polymer resin material.

Further, if the intermediate frame comprising an intermediate frame body and an opening/closing lid member, used in the present invention, forms a tubular connecting structure in which they were articulately connected to each other and has a form in which a cable or the like is inserted and can be held and guided, any annular forms having cross-sections such as a circular cross-section, an oval cross-section, a rectangular cross-section and the like may be used.

Further a number of intermediate frames in the present invention may be used if they are articulately connected to each other to form a tubular structure. As the concrete connection structures, a connecting structure in which a connecting pin portion and a pin hole portion of the adjacent intermediate frames are fitted to each other, a connecting structure in which the pin hole portions of the adjacent intermediate frames are connected to a connecting pin of another part or the like can be adopted.

Action

When a cable or the like such as an electric cable, a hydraulic or pneumatic hose or the like, which performs electrical supply, liquid supply or the like, is moved together with a machine, which operates while moving, such as a machine tool, an electronic device, a civil engineering machinery, a transfer system or the like, or a mobile portion of a machine, the closed cable drag chain of the present invention sequentially causes portions exhibiting required articulated positions of a number of adjacent intermediate frames coupled in a tubular shape to sequentially displace in accordance with the mobile positions of mobile portions while adjacent lower open end surfaces formed on the intermediate frames are brought into contact with each other on the articulated inner peripheral side of the chain thereby ensuring a required bending radius, whereby the cable or the like can be moved together with the mobile portion of the machine while being held and guided.

Further, at a moving position where said adjacent intermediate frames do not need a required articulated position, adjacent upper open end surfaces formed on the adjacent intermediate frames are brought into contact with each other on the articulated outer peripheral side of the chain, and bend limiting end portions formed on the opening/closing lid members are brought into contact with each other, whereby inserted cable or the like is while maintaining a straightly extended position.

On the other hand, when a number of intermediate frames are connected to each other to assemble a chain, at least any one of front and rear connecting portions of said intermediate frame body is integrally two-color injection molded with a second polymer resin material softer than a first polymer resin material forming other portions of said intermediate body. Thus, the connecting pin portion and pin hole portion in the intermediate frames are subjected to fitting, which allows a change of their shapes.

A better understanding of the invention will be had when reference is made to the DESCRIPTION OF THE INVENTION and CLAIMS which follow hereinbelow.

DESCRIPTION OF THE INVENTION

Embodiments of the Invention

Figure 1:
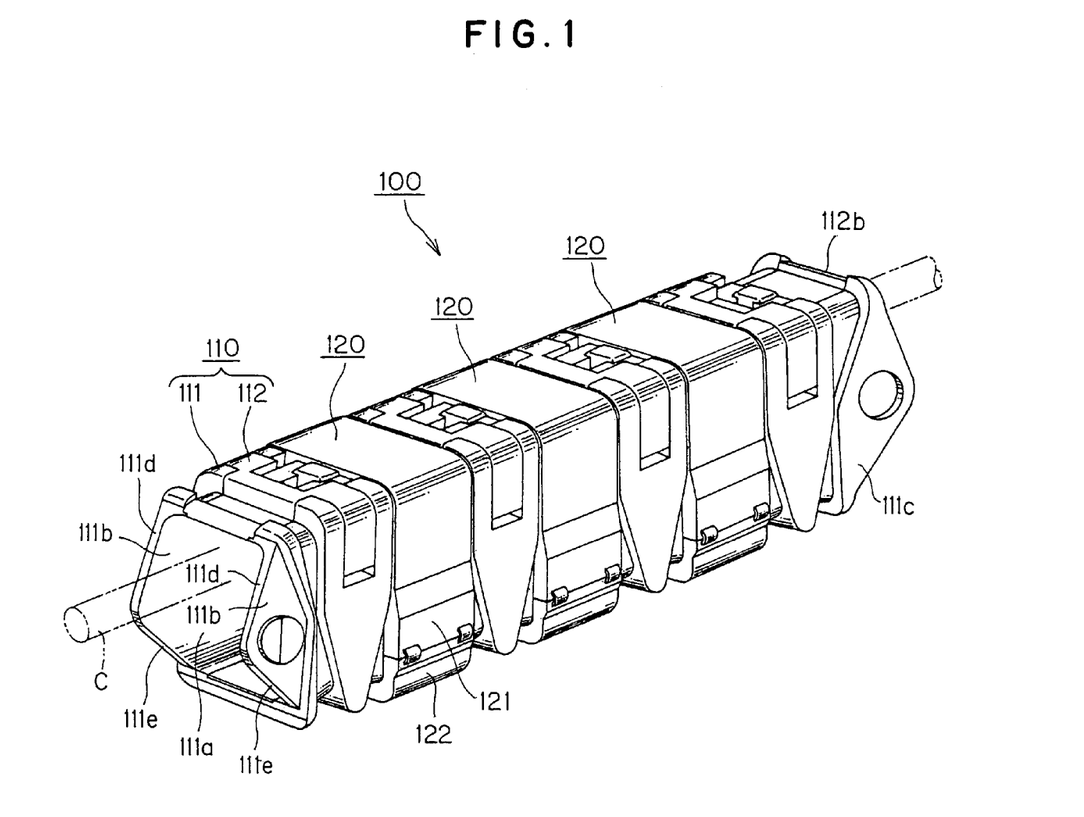
FIG. 1 is an assembly view of a closed cable drag chain, which is one Example of the present invention.
Figure 2:
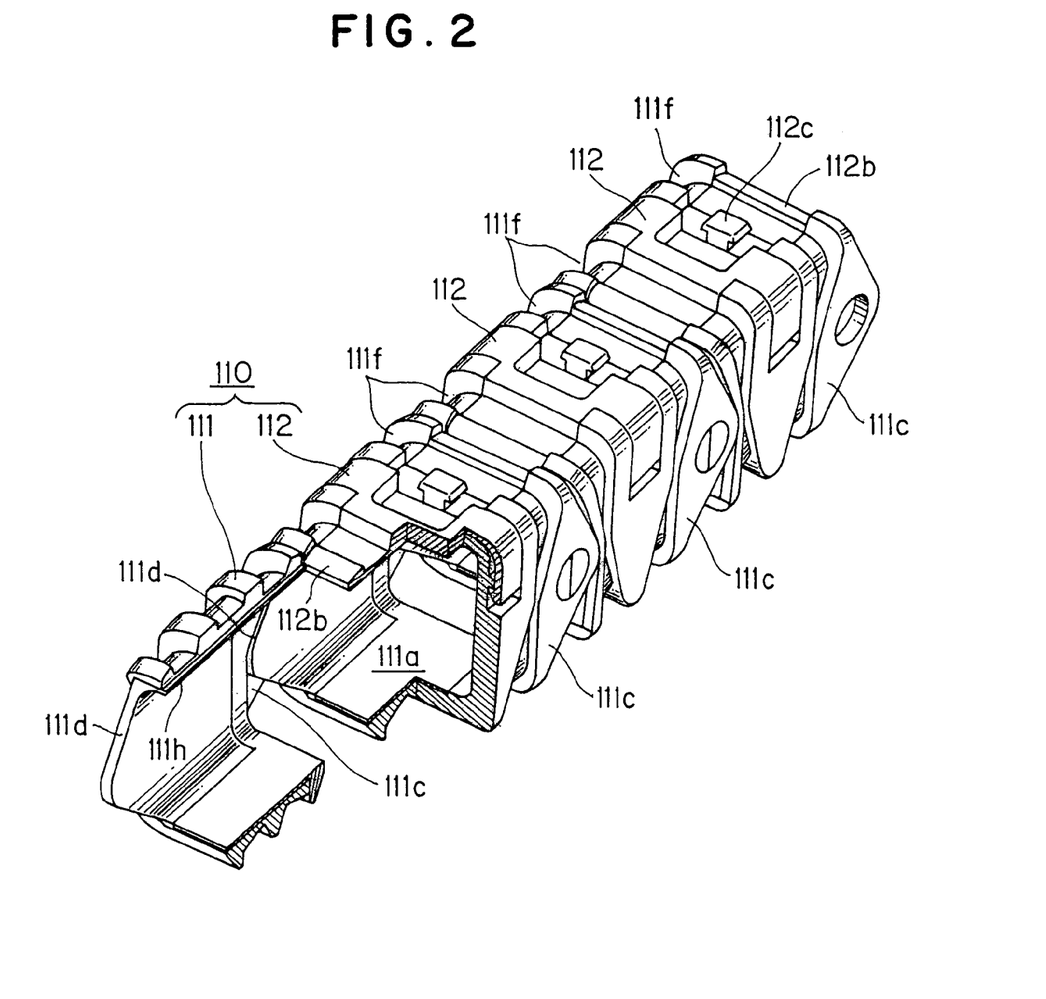
FIG. 2 is an assembly view in which outer frames of the closed cable drag chain shown in FIG. 1 were removed.
Figure 3:
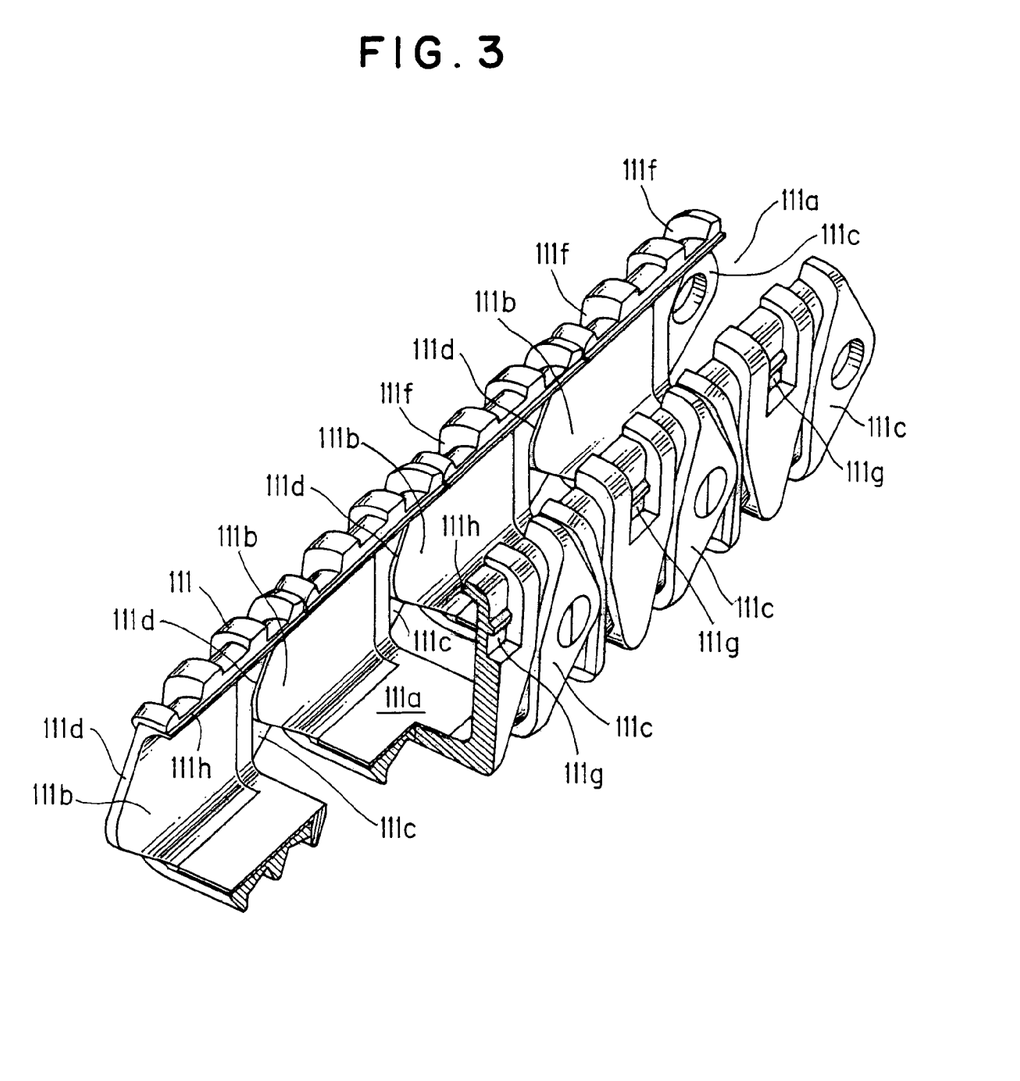
FIG. 3 is an assembly view in which the outer frames and opening/closing lid members of the closed cable drag chain shown in FIG. 1 were removed.
Figure 4:
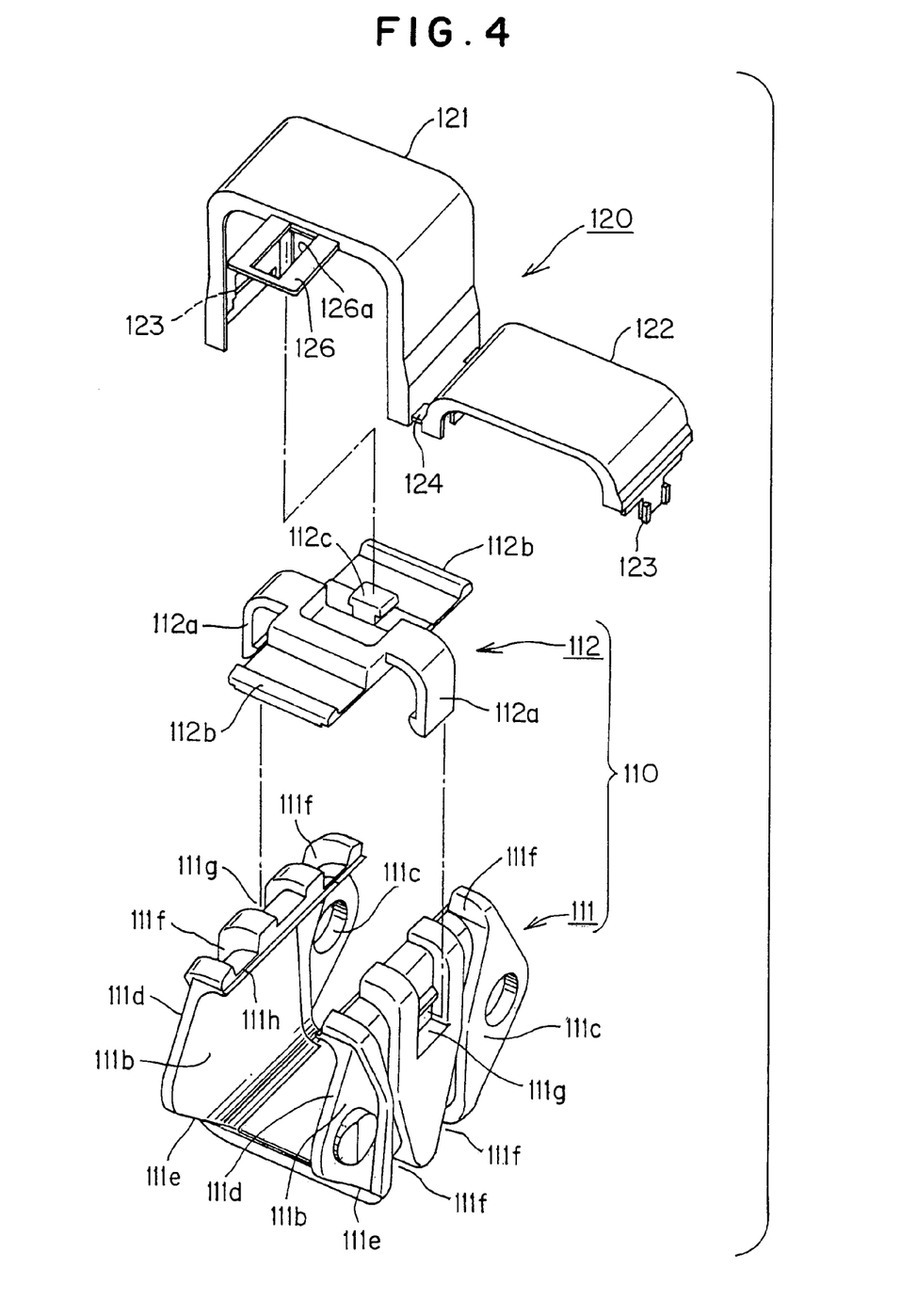
FIG. 4 is a disassembled view of the closed cable drag chain shown in FIG. 1.
Figure 5:
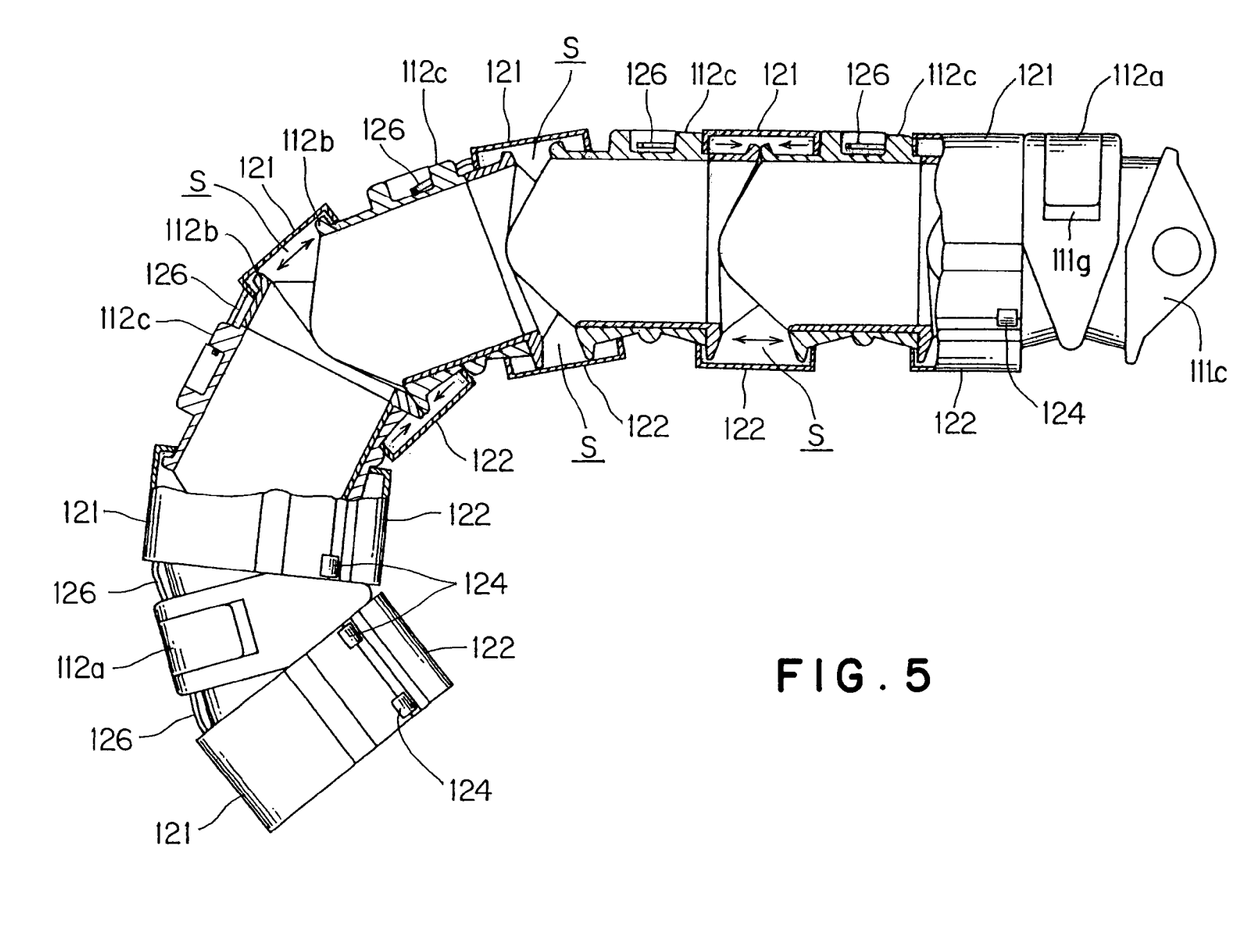
FIG. 5 is a side sectional view showing a state of the operation of the closed cable drag chain shown in FIG. 1.

One Example of a closed cable drag chain preferable as the present invention will be described with reference to FIGS. 1 and 3. FIG. 1 is an assembly finished view of a closed cable drag chain, which is one Example of the present invention, FIG. 2 is an assembly view in which outer frames of the closed cable drag chain shown in FIG. 1 were removed, FIG. 3 is an assembly view in which the outer frames and opening/closing lid members of the closed cable drag chain shown in FIG. 1 were removed, FIG. 4 is a disassembled view of the closed cable drag chain shown in FIG. 1, and FIG. 5 is a side sectional view showing a state of the operation of the closed cable drag chain shown in FIG. 1.

A closed cable drag chain 100 of the present Example has a basic structure as shown in FIGS. 1 to 4, in which a number of intermediate frames 110 are articulately connected to each other to form a tubular shape and by fit-covering a removable outer frame 120 between the intermediate frames 110 to close connecting spaces S respectively a tubular fitting state consisting of the number of intermediate frames 110 and the outer frames 120 are formed, whereby an inserted cable or the like C is guided while being held.

That is, the intermediate frame 110 comprises an intermediate frame body 111 provided with a cable holding groove 111a for inserting the cable or the like C therein and an opening/closing lid member 112 fitted into the cable holding groove 111a. The frame shape is an annular shape having a rectangular cross-section.

Further, the intermediate frame body 111 includes front connecting portions 111b provided with protruded connecting pins and rear connecting portions 111c provided with pin holes, so that the connecting portions 111b and the connecting portions 111c of the adjacent intermediate frame bodies 111 are articulately connected to each other and the intermediate frame bodies can be coupled in a tubular shape. Further, in the intermediate frame body 111, there are formed adjacent upper open end surfaces 111d, which are brought into contact with each other on a articulated outer peripheral side of the chain to hold a straightly extended position, and adjacent lower open end surfaces 111e, which are brought into contact with each other while circulating on an articulated inner peripheral side of the chain to hold a required articulated position.

Here, the most characteristic molding of the intermediate frame body 111 in the closed cable drag chain of the present Example will be described in detail. The connecting portion 111c provided with a pin hole on the rear side of said intermediate frame body 111 is integrally two-color injection molded with a second polymer resin material made of a polyamide resin softer than a first polymer resin material made of a glass-fiber reinforced polyamide resin, which forms portions except for the connecting portion 111c of the intermediate frame body 111.

Therefore, in the present Example, when the adjacent upper open end surfaces 111d, which hold straightly extended position are sequentially brought into contact with each other on an articulated outer peripheral side of the chain, or when the adjacent lower open end surfaces 111e, which hold a required articulated position, are sequentially brought into contact with each other while circulating on an articulated inner peripheral side of the chain, the connecting portion 111c made of a soft polyamide resin imparts relative cushioning action and sound-absorbing action to the connecting portion 111b made of a glass-fiber reinforced polyamide resin. Thus, clattering sounds, which tend to occur in a conventional closed cable drag chain, can be significantly suppressed whereby one cause of the occurrence of noises under operation environment can be removed. Further, since the connecting portion 111c made of a polyamide resin relatively exhibits flexibility through a slight shape change in a fitting operation between the connecting portions 111b and 111c of the adjacent intermediate bodies 111, an assembly operation can be easily attained.

Further, as shown in FIGS. 2 and 3, a groove bottom portion 111a of the cable holding groove 111a provided with the intermediate frame body 111 of the present Example inside is integrally two-color injection molded with a second polymer resin material made of the same polyamide resin as the connecting portion 111c provided with a pin hole on the rear side of the intermediate frame body 111. Therefore, when the adjacent lower open end surfaces 111e (FIG. 4) of said intermediate frames 110 are brought into contact with each other on the articulated inner peripheral side while circulating to hold a required articulated position as shown in FIG. 5, even if the groove bottom portions of the adjacent cable holding grooves 11a are bent mutually and produce edges in an abutment state, the lower open end surfaces 111e act a soft cushion action on cable or the like C such as a cable or a hose. Therefore, early wear of a cover applied to the cable or the like can be suppressed.

In a connection structure of the closed cable drag chain of the present Example, assembling and disassembling can be extremely easily performed without use of a connecting pin, which is another part. However, a connecting structure in which pin holes engraved in the connecting portions 111c of the adjacent intermediate frame bodies 111 were reliably connected by a connecting pin, which is another part, may be used. Further, a reference numeral 111f denotes a fitting groove provided on an outer peripheral surface of the intermediate frame 110 to fit-cover the outer frame 120 between the intermediate frames 110 so as to close connecting space S.

An opening/closing lid member, which fits to said cable holding groove 111a, is molded by use of a first polymer resin material made of a glass-fiber reinforced polyamide resin, and is elastically fitted to side wall engagement portions 111g, 111g of the intermediate frame body 111 by converted U-shaped locking arms 112a, 112a, which are extended on both sides of the lid body 112 to exhibit a plate spring effect, and at the same time it is fitted to step portions 111h provided on top ends in the cable holding groove 11a, whereby the flowing out of contact wear powder, which is generated in the cable holding groove 111a, through the fitted portions is prevented.

And as mentioned above, said opening/closing lid member 112 includes bend limiting end portions 112b, which limit the articulation of chain in an auxiliary manner, so that the adjacent opening/closing lid members 112 are brought into contact with each other on the articulated outer peripheral side of the chain as in the upper open end surfaces 111d formed in the intermediate frame body 111 of the intermediate frame 110 at a moving position, where the adjacent intermediate frames 110 do not require a required bent position, and straightly extended position can be maintained.

Further, in a case where at least any one of front and rear bend limiting end portions 112b of the opening/closing lid member 112 is integrally two-color injection molded with a second polymer resin material made of a polyamide resin softer than the first polymer resin material made of a glass-fiber reinforced polyamide resin forming other parts of the opening/closing lid member 112, the bend limiting end portions 112b of the opening/closing lid member 112 made of a soft second polymer resin material aid relative cushioning action and sound-absorbing action when the adjacent upper open end surfaces 111d for supporting a straightly extended position are brought into contact with each other on the articulated outer peripheral side of the chain. Thus, clattering sounds, which tend to occur in a conventional closed cable drag chain, are significantly suppressed so that one cause of the generation of noises under operation environment can be completely removed.

On the other hand, the outer frame 120 adopted in the present Example is formed by use of a second polymer resin material made of polyamide resin softer than the first polymer resin material made of said glass-fiber reinforced polyamide resin, and includes an upper outer frame 121 and a lower outer frame 122, removable from the connecting portions between the intermediate frames 111, respectively. Since the outer frame 120 adopts an integrated type frame, which is opened/closed in a vertical direction by means of a snap locking portion 123 provided on one end where the upper outer frame 121 and the lower outer frame 122 are connected to each other, and a hinge portion 124 provided on the other end thereof, the upper outer frame 121 or the lower outer frame 122 cannot be separately lost during disengagement of the outer frame 120.

It is noted that the above-mentioned outer frame 120 may adopt an integral type frame in which it includes an openable structure composed of right and left outer frames and is opened from side to side on the bend outer peripheral side of the chain.

Further, a tongue-shaped engagement piece 126 having a bored engagement hole 26a is provided in said outer frame 120 so that it is movably engaged in the opening/closing lid member 112 in a connecting direction of the engagement piece 126. Further, the engagement hole 126a of the engagement piece 126 is relatively movably connected to an engagement portion 112c comprising a stopping protrusion protruded on the opening/closing member 112.

As described above, the sliding resistance generated on the intermediate frame body 111 reduces the collision speed of the adjacent intermediate frame bodies 111 whereby these collision noises can be lowered. Additionally, the engagement piece 126 of the outer frame 120 is integrally connected to the engagement portion 112c of the opening/closing member 112. Thus, when the opening/closing member 112 is removed from the intermediate frame body 11, even if an upper outer frame 121 of the upper frame 120 and a lower outer frame thereof are being opened, the parts loss of the outer frame 110 and the opening/closing member 112 can be prevented during the maintenance by the integral form of the outer frame 120 and the opening/closing member 112 of the intermediate frame 110.

Next, the basic chain operation of the closed cable drag chain 100 according to the present Example is as follows.

In the closed cable drag chain 100 of the present Example as shown in FIGS. 4 and 5, when a mobile portion in a machine tool as well as a cable or the like C such as a cable, a hydraulic hose or the like are moved, the position exhibiting a required bending or articulation position of a number of intermediate frames 110 engaged in a tubular shape is sequentially displaced in accordance with the movement position of the moving portion while the lower open end surfaces 111e provided on the intermediate frame body 111 of the intermediate frame 110 are brought into contact with each other in directions of arrows on bending inner peripheral sides in FIG. 5 to ensure a required bending radius, whereby the cable or the like C as well as the moving portion of the machine tool can be moved while being held and guided.

Further, the upper opened end portion 111d formed in the intermediate frame body 111 of the intermediate frame 110 and the bend limiting end portion 112b of the opening/closing lid member 112 inserts the cable or the like C to hold it while abutting with the chain in directions of arrow in FIG. 5 on the respective chain bending outer peripheral sides and maintaining the straight extended position at a moving position where the adjacent frames 10 do not require a required bending position.

The thus obtained closed cable drag chain 100 of the present Example can remove the intermediate frame 120 and open/close the opening/closing lid member 112 without disassembling the engagement of the adjacent intermediate frames 110 by including the above-mentioned chain structure. Thus, the assembling of the chain in inserting a cable or the like C in the chain and maintenance and repair not only become easy but also the scattering of the contact wear powder, which is likely to occur in holding and guiding the cable or the like C can be reliably prevented and the clattering sounds and sliding noise, which are generated between members, can be removed by integrally two-color molding the connecting portions 111c provided with pin holes on the rear portions by the use of polyamide resin softer than glass-fiver reinforced polyamide resin forming other portions of the intermediate frame body 111. Furthermore, early wear of the cable or the like can be suppressed and weight reduction of the chain and cost reduction can be realized resulting in significant effects.

EFFECTS OF THE INVENTION

As described above, in the closed cable drag chain according to claim 1, a number of intermediate frames comprising intermediate frame bodies provided with cable holding grooves inside and opening/closing lid members fitted to said cable holding grooves are articulately connected to each other, and removable outer frames are fitted to and covered on the connecting portions between the adjacent intermediate frames. Thus, scattering of the contact wear powder generated in holding and guiding an inserted cable or the like into operating space can be blocked. Thus, only the opening/closing lid member can be freely opened/closed at an upper position of the intermediate frame body irrespective of engagement and disengagement between the adjacent intermediate frames. Therefore, even after the drag chain was attached to a mobile machine such as a machine tool, an electronic device, a civil engineering machinery, a transfer system or the like, a cable or the like can be easily inserted into the drag chain to assemble it. As a result the cable or the like in a cable holding groove can be easily checked and repaired during its maintenance, as well as weight reduction can be attained.

Further, in the invention of claim 1, an upper open end surface, which is brought into the adjacent upper open end surface on the articulating outer peripheral side of the chain to hold a straightly extended position, and a lower open end surface, which is brought into contact with the adjacent lower open end surface while circulating on the articulating inner peripheral side of the chain while circulating to hold a required bent or articulated position, are formed in the intermediate frame body of the intermediate frame. Thus, when a cable or the like is caused to move together with a mobile portion of a machine, the lower open end surfaces of the intermediate frame bodies sequentially displace a portion exhibiting a required articulated position while mutually ensuring a required bending radius whereby the cable or the like can be reliably guided and moved. Further, in a mobile position where the adjacent intermediate frames do not need a required bending position, the inserted state of the cable or the like in the chain can be stabilized and held while the adjacent upper open end surfaces formed in the adjacent intermediate bodies of the intermediate frames maintains a straightly extended position.

Further in to the closed cable drag chain according to claim 1, at least any one of said front and rear portions in the connecting portions of said intermediate frame bodies is integrally two-color injection-molded with a second polymer resin material softer than a first polymer resin material forming other portions of the intermediate frame body. When the adjacent upper open end surfaces, which hold a straightly extended position, are sequentially brought into contact with each other on the articulated outer peripheral side of the chain, or when the adjacent lower open end surfaces, which hold a required articulation position, are sequentially brought into contact with each other on the articulated inner peripheral side of the chain while circulating, the connecting portion made of a soft second polymer resin material exhibits relative cushion action and sound-absorbing action. Accordingly, clattering sounds, which tend to occur in a conventional closed cable drag chain, are significantly suppressed so that one cause of the noise generation under operating environment can be removed. Further, since the fitting operation of a connecting portion between the adjacent intermediate frames exhibit flexibility by slight displacement of the members, assembling operation can be easily attained.

Further, in the closed cable drag chain according to claim 2, in addition the effect of the invention according to claim 1, at least any one of said front and rear bend limiting end portions of said opening/closing lid member is integrally two-color injection-molded with a second polymer resin material softer than a first polymer resin material forming other portions of the opening/closing lid member. Accordingly, the bend limiting end portions 112b of the opening/closing lid member 112 made of a soft second polymer resin material aid relative cushioning action and sound-absorbing action when the adjacent upper open end surfaces 111d for supporting a straightly extended position are brought into contact with each other on the articulated outer peripheral side of the chain. Thus, clattering sounds, which tend to occur in a conventional closed cable drag chain, are significantly suppressed so that one cause of the generation of noises under operation environment can be completely removed.

Further, in the closed cable drag chain according to claims 3 and 4, in addition to the effect of the invention according to claims 1 and 2, respectively, at least a groove bottom portion of the cable holding groove provided in said intermediate frame is integrally two-color injection-molded with said second polymer resin material. Accordingly, when the adjacent lower open end surfaces of the adjacent intermediate frames are brought into contact with each other on the articulation inner side of the chain while circulating to hold a required articulation position, even if these contact or connecting portions form edges, they exhibit a soft cushioning action whereby early wear of a cover on a cable, hose or the like can be suppressed.

Further, in the closed cable drag chain according to claims 5, 6, 7, and 8 in addition to the effect of the invention according to any one claims 1, 2, 3, and 4, respectively, said outer frame is molded with the second polymer resin material. Accordingly, when the adjacent upper open end surfaces and the adjacent lower open end surfaces of the adjacent intermediate frames are brought into contact with each other respectively, outer frames, which are contact slidable so as to fit-cover a connecting space between the adjacent intermediate frames, suppresses sliding contact sounds, which tend to generate between the outer frame and the intermediate frame whereby one cause of the generation of noise under operating environment can be further resolved.

Description of Reference Numerals 110, 510 . . . Intermediate frame
111, 511 . . . Intermediate frame body
111a, 511a . . . Cable holding groove
111b, 511b . . . Front connecting portion provided with a protruded connecting pin
111c, 511c . . . Rear connecting portion provided with a pin hole
111d, 511d . . . Upper open end surface
111e, 511e . . . Lower open end surface
111f, 511f . . . Fitting groove
111g, 511g . . . Side wall engagement portion
111h, 511h . . . Step portion
112, 512 . . . Opening/closing lid member
112a, 512a . . . Locking arm
112b, 512b . . . Bend limiting end portion
112c, 512c . . . Engagement portion
120, 520 . . . Outer frame
121, 521 . . . Upper outer frame
122, 522 . . . Lower outer frame
123, 523 . . . Snap locking portion
124, 524 . . . Hinge portion
126, 526 . . . Engagement piece
126a, 526a . . . Engagement hole
C . . . Cable or the like
S . . . Connecting space While the invention has been described herein by way of example, those skilled in the art will readily recognize that changes may be made to the invention without departing from the spirit and scope of the claims which follow hereinbelow.

I claim:

1. A closed cable drag chain comprising a number of intermediate frames, removable opening/closing lid members and removable outer frame members, each of said intermediate frames includes an articulated outer peripheral side and an articulated inner peripheral side, said intermediate frame includes an intermediate frame body, each said intermediate frame body includes an inner portion, side wall portions, a front portion and a rear portion, each said intermediate body includes a cable holding groove residing in said inner portion, each said side wall portion includes an engagement portion, said front and rear portions include connecting portions, said removable opening/closing lid members are fitted to said engagement portions of said side walls, each said intermediate frame body includes upper and lower open end surfaces, said upper open end surfaces of each intermediate frame body are brought into contact with adjacent open end surfaces of adjacent intermediate frame bodies on said articulated outer peripheral side of said chain to maintain a straightly extended position and said lower open end surfaces of each intermediate frame body are brought into contact on said articulated inner peripheral side of said chain while circulating to maintain a required articulated position, said intermediate frames are articulately connected through said connecting portions, and said cable is inserted into said chain and said removable outer frames cover connecting spaces between said adjacent intermediate frames to close the respective connecting spaces between said adjacent intermediate frames, whereby said cable is held and guided, characterized in that:

at least any one of said front and rear connecting portions of each of said intermediate frame bodies is integrally two-color injection-molded; a first polymer resin is used to form all portions of each of said intermediate frame bodies except said at least any one of said front and rear connecting portions of each of said intermediate frame bodies; and, a second polymer resin material softer than said first polymer resin material is used to form said at least any one of said front and rear connecting portions of each of said intermediate frame bodies; and, each of said removable opening/closing lid members includes front and rear bend limiting end portions and at least any one of said front and rear bend limiting end portions of each of said opening/closing lid members is integrally two-color injection-molded; said first polymer resin is used to form all portions of each of said opening/closing lid members except said at least any one of said front and rear bend limiting end portions of each of said opening/closing lid members; and, said second polymer resin material softer than said first polymer resin material forms said at least any one of said front and rear bend limiting end portions of each of said opening/closing lid members.

2. The closed cable drag chain according to claim 1, characterized in that at least a groove bottom portion of the cable holding groove provided in each of said intermediate frame bodies is integrally two-color injection-molded with said second polymer resin material.

3. The closed cable drag chain according to claim 1, characterized in that each of said intermediate frame bodies includes an outer frame i molded with said second polymer resin material.

4. The closed cable drag chain according to claim 2, characterized in that each of said intermediate frame bodies includes an outer frame is molded wit said second polymer resin material.

\* \* \* \* \*

UNITED STATES PATENT AND TRADEMARK OFFICE
CERTIFICATE OF CORRECTION

PATENT NO. : 6,966,527 B2
DATED : November 22, 2005
INVENTOR(S) : Komiya

It is certified that error appears in the above-identified patent and that said Letters Patent is hereby corrected as shown below:

Column 1,
Line 62, after "520" delete ";" and insert -- , --.

Column 2,
Line 30, after "chain" delete "according to claim 1,".
Line 55, after "chain" delete "according to claim 2,".
Lines 61-62, after "member" delete "in addition to the configuration of claim 1".
Line 63, after "chain" delete "according to claims 3 and 4".

Column 3,
Line 1, after "material" delete "in addition to the configuration according to claims 1 and 2, respectively".
Line 3, after "chain" delete "according to claims 5, 6, 7, and 8".
Line 6, after "material" delete "in addition to the configuration according to claims 1, 2, 3 and 4, respectively".

Column 5,
Line 58, after "grooves" delete "11a" and insert -- 111a --.

Column 6,
Line 16, after "groove" delete "11a" and insert -- 111a --.

Column 8,
Lines 3-4 and 45-46, after "chain" delete "according to claim 1,".
Line 24, after "invention" delete "of claim 1".

Column 9,
Line 1, after "chain" delete "according to claim 2, in addition the effect of the invention according to claim 1,".
Line 19, after "chain" delete "according to claims 3 and 4, in addition to the effect of the invention according to claims 1 and 2, respectively,".
Line 32, after "chain" delete "according to claims 5, 6, 7, and 8, in addition to the effect of the invention according to any one claims 1, 2, 3, and 4, respectively,".

Column 10,
Line 15, after "side," insert -- each --.

Column 11,
Line 5, after "frame" delete "i".

UNITED STATES PATENT AND TRADEMARK OFFICE
CERTIFICATE OF CORRECTION

PATENT NO. : 6,966,527 B2
DATED : November 22, 2005
INVENTOR(S) : Komiya

It is certified that error appears in the above-identified patent and that said Letters Patent is hereby corrected as shown below:

Column 12,
Line 3, after "frame" delete "is" and after "molded" delete "wit" and insert -- with --.

Signed and Sealed this

Twenty-first Day of February, 2006

JON W. DUDAS
*Director of the United States Patent and Trademark Office*